Patented Feb. 10, 1953

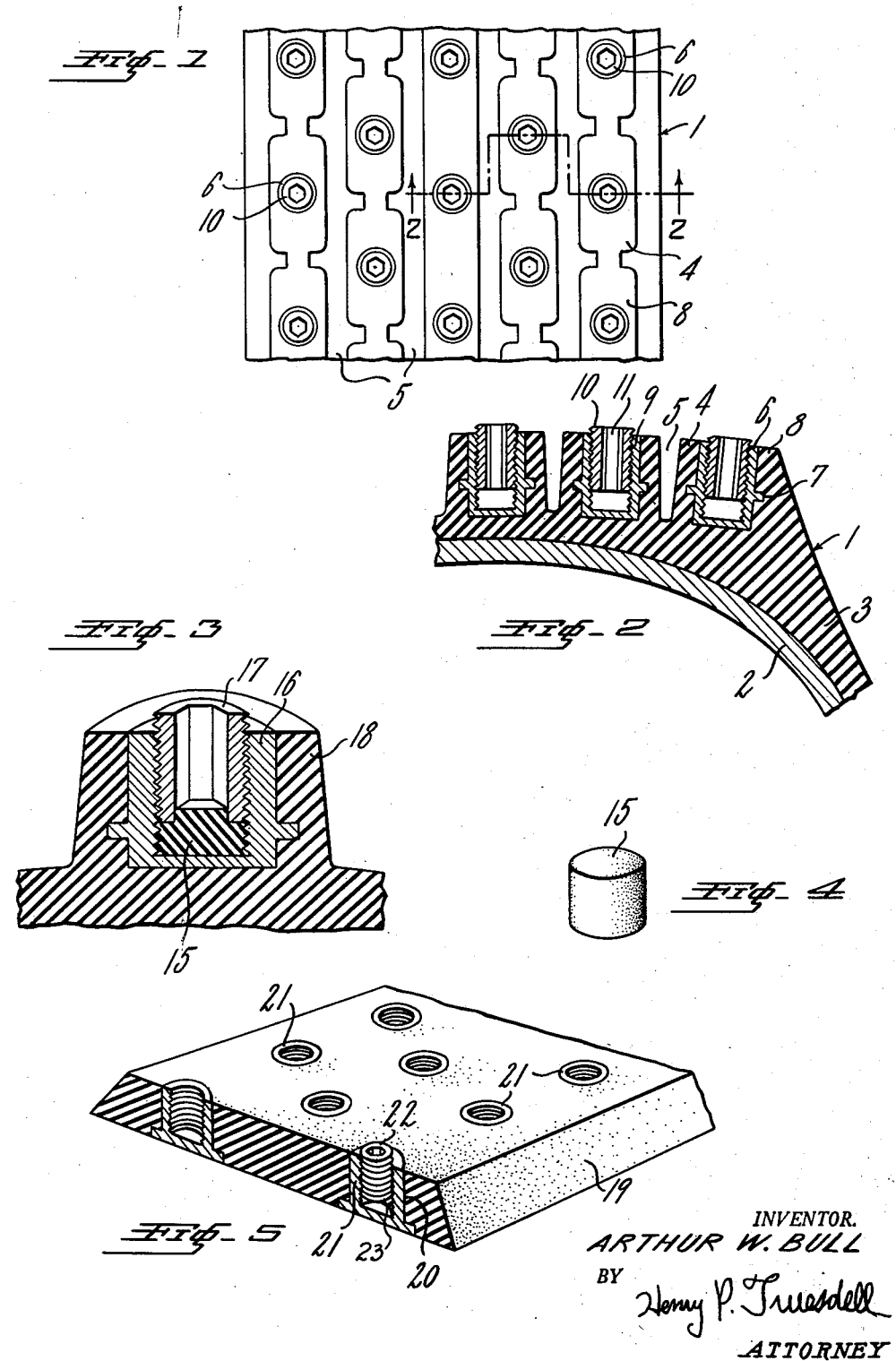

2,627,888

UNITED STATES PATENT OFFICE 2,627,888

TIRE TREAD HAVING ADJUSTABLE TRACTION DEVICE

Arthur W. Bull, Grosse Pointe, Mich., assignor to United States Rubber Company, New York, N. Y., a corporation of New Jersey Application January 28, 1950, Serial No. 141,004

2 Claims. (Cl. 152—210)

This invention relates to a traction device for tires and more particularly it relates to an improved tire tread having a traction device which may be adjustably positioned with respect to the surface of the tire.

Many attempts have been made to improve the traction and anti-skid properties of tires, especially on ice-covered surfaces, to facilitate starting on such surfaces and to reduce or eliminate the dangerous tendency to skid when stopping or turning on such surfaces. For this purpose, traction inserts of various kinds are frequently incorporated in tire treads. However, there is sometimes observed a tendency for such inserts to wear below the surface of the rubber, thereby rendering the inserts relatively less effective for their intended purpose.

One object of the present invention is to provide traction elements in a tire surface that can be progressively adjusted outwardly as the tire wears, thereby counteracting any tendency of the insert to wear below the surface of the tire.

Another object is the provision of anti-skid means which can be adjusted to give the desired degree of traction in accordance with the weather and road conditions.

Still another object of the invention is to provide a tire tread having a renewable traction device.

A further object of my invention is the provision of a camelback composition, or retreading composition, having associated therewith means for accommodating traction elements of the character indicated.

Other objects and advantages of the invention will be apparent in the following detailed description when read in conjunction with the accompanying drawing, wherein Fig. 1 is a plan view of a portion of a pneumatic tire embodying the features of this invention;

Fig. 2 is a fragmentary sectional view on a larger scale taken substantially along the line 2—2 of Fig. 1;

Fig. 3 is a fragmentary sectional view of a modification of the traction device of this invention;

Fig. 4 is a perspective view of a rubber plug for association with the traction device of Fig. 3; and Fig. 5 is a fragmentary sectional and perspective view of a camelback strip, or retreading strip, embodying the invention.

Referring to Figs. 1 and 2, the form of the invention shown therein comprises a pneumatic tire 1 having the usual carcass portion 2, containing inextensible bead elements in the rim thereof (not shown), an overlying side wall and sub-tread portion 3, and a tread portion 4 made of any of the rubber compositions conventionally employed for this purpose. If desired, the tread portion 4 may have any suitable anti-skid design formed therein, such as the rib and block design defined by grooves 5.

For the purpose of holding traction elements in the surface of the tread 4, there are provided a plurality of suitably disposed inserts 6, which are molded in the tread during manufacture of the tire so as to become integral therewith. Each insert 6 is generally cup-like and cylindrical in form, and has near its base a projecting annular rim or flange 7 to aid in retaining it firmly in place. The insert 6 is typically made of metal, usually a relatively hard ferrous metal or alloy, such as steel, although other metals, alloys, plastic compositions etc. may be employed. If desired, the insert 6 may be treated to promote its adhesion to the rubber tread composition 4, as by plating with suitable metals, or coating with cements, etc. The insert 6 is usually installed substantially flush with the road contacting surface 8 of the tread 5.

The cylindrical interior of the insert 6 is provided with a thread 9, into which is threaded a correspondingly threaded adjustable traction element 10 of generally annular form. The traction elements 10 is made of relatively hard tough material, usually metal, such as a ferrous metal, e. g. steel. The interior surface 11 of the element 10 is given a shape suited to accommodate an adjusting tool, such as the hexagonal configuration shown which is adapted to receive an Allen wrench.

In operation, the traction element 10 is turned into or out of the holding insert 6, so as to project the desired distance, usually for example 1/8", above the surface 8 of the tread 4 to give optimum traction and anti-skid properties, depending on the condition of the road surface. As the surface of the tread wears down in use, the traction insert 10 and the holding insert 6 also wear down. With conventional non-adjustable traction inserts the tendency is for the insert to wear faster than the rubber so that the insert eventually wears below the road-contacting surface of the tread, and becomes comparatively ineffective for its intended purpose. However, with the present device, this tendency may be compensated for by turning the adjustable traction insert 10 outwardly from time to time as the tire surface wears down, in order that the insert will always project the desired distance from the road contacting surface. In fine weather, the traction element 10 may be turned all the way into the holding insert 6 so that there is substantially no contact between the traction element and the road, thereby avoiding unnecessary wear on the traction element and at the same time making possible smoother riding of the tire. If the traction element 10 eventually wears out entirely, it may be easily and economically replaced with another such unit, so that even in a well worn tire, it is possible to have the same highly efficient traction benefits that are obtained when the tire is new.

In order to prevent the traction elements 10 from working loose from the holding inserts 6 due to road impacts, vibration, etc., I make the thread 9 relatively tight-fitting. I may also provide left-hand threads on the elements located on one side of the center line of the tire, and right-hand threads on the inserts located on the other side of the center line of the tire in such manner as to counteract any tendency for the traction elements to unscrew on the left and right sides of the tire.

In the modification of the invention shown in Figs. 3 and 4, I have provided a locking device to prevent spontaneous turning of the adjustable element, comprising a small cylindrical rubber plug 15 adapted to fit within an insert 16 under a traction element 17. Insertion of the traction element results in compression and distortion of the plug 15, whereby it frictionally engages the traction element and the holding insert with sufficient force so that any tendency for the insert to turn due to road impacts or vibration is substantially eliminated. The insert 16 is similar to the insert 6 previously described, but is in this case shown molded into a knob 18 of a conventional tread provided with an anti-skid pattern comprising a plurality of such knobs.

In addition to providing my adjustable traction device in new tires during manufacture thereof, I may also provide old tires or worn tires with my improved construction, conveniently by retreading such old worn tires with a camelback strip, that is, a strip of the usual tire retreading composition, containing holding inserts for adjustable traction elements. An improved camelback strip of this character is illustrated in Fig. 5, wherein 19 is a conventional camelback composition in strip form, having inserted in suitable holes 20 therein a plurality of holding elements 21. The holding elements 21 may be disposed in any desired pattern, consistent with the tread pattern, if any, to be impressed on the tread during vulcanization in the retreading mold. Suitable adjustable traction elements 22 are screwed into internal threads 23 of the holding elements 21, as described previously.

From the foregoing, it is evident that I have provided an adjustable and renewable traction means which may be conveniently associated with new tires or with old tires, and which possesses unique advantages over conventional traction inserts.

Having thus described my invention, what I claim and desire to protect by Letters Patent is:

1. A tire having embedded in its tread surface inserts disposed substantially flush with the road-contacting surface of the tread, each of said inserts having a hollow central portion threaded on its interior wall, and having inserted therein a cylindrical traction element correspondingly threaded throughout its length on its outer surface, and having a hollow central portion adapted to receive an adjusting wrench for turning the traction element into or out of the insert to selectively position it at a desired height above the road-contacting surface of the tread irrespective of the amount said traction element has been worn away through use, and the said traction element being shorter than the interior of the insert so that the traction element may be turned completely within the insert and below the road-contacting surface of the tread, thereby rendering the traction element inoperative.

2. A tire having embedded in its tread surface inserts disposed substantially flush with the road-contacting surface of the tread, each of said inserts having a hollow central portion threaded on its interior wall, and having inserted therein a cylindrical traction element correspondingly threaded throughout its length on its outer surface, and having a hollow central portion adapted to receive an adjusting wrench for turning the traction element into or out of the insert to selectively position it at a desired height above the road-contacting surface of the tread irrespective of the amount said traction element has been worn away through use, and the said traction element being shorter than the interior of the insert so that the traction element may be turned completely within the insert and below the road-contacting surface of the tread, thereby rendering the traction element inoperative, and a resilient plug disposed in the lower portion of the hollow interior of the said insert for frictionally engaging the lower portion of the traction element to prevent it from turning spontaneously.

ARTHUR W. BULL.

REFERENCES CITED

The following references are of record in the file of this patent:

UNITED STATES PATENTS

| Number | Name | Date |
|---|---|---|
| 738,369 | Spurrier | Sept. 8, 1903 |
| 1,269,182 | Hollis | June 11, 1918 |
| 1,272,807 | Ilieff | July 16, 1918 |
| 2,376,592 | Harris | May 22, 1945 |
| 2,498,523 | Bergen | Feb. 21, 1950 |
| 2,511,690 | Bergen | June 13, 1950 |